United States Patent
Fullmer

[19]

[11] Patent Number: 5,947,008
[45] Date of Patent: Sep. 7, 1999

[54] STEAMWARE SYSTEM

[76] Inventor: Hazel J. Fullmer, 475 E. Northern Ave., Springfield, Ohio 45503

[21] Appl. No.: 09/114,421

[22] Filed: Jul. 10, 1998

[51] Int. Cl.$^6$ .............................. A47J 27/00; A47J 27/10
[52] U.S. Cl. .......................... 99/342; 99/285; 99/323.3; 99/417; 99/483; 99/493; 126/246; 126/369; 220/574.2; 220/592.27
[58] Field of Search .................................. 99/285, 323.3, 99/339, 275, 342, 403, 410–417, 493, 483, DIG. 14; 220/574.2, 627, 575, 592.27, 23.87, 700; 126/369, 400, 246, 378; 219/731, 734, 401; D7/354–356, 543

[56] References Cited

U.S. PATENT DOCUMENTS

| | | | |
|---|---|---|---|
| 2,545,733 | 3/1951 | Hatfield | 220/574.2 |
| 2,683,974 | 7/1954 | Brown | 220/574.2 |
| 2,772,754 | 11/1956 | Winkler | 126/246 X |
| 3,109,359 | 11/1963 | Falla | 99/342 X |
| 3,636,860 | 1/1972 | Green | 99/483 X |
| 3,808,963 | 5/1974 | Ludena | 99/339 X |
| 4,094,295 | 6/1978 | Boswell | 99/417 |
| 4,495,860 | 1/1985 | Hitch | 99/493 X |
| 4,649,811 | 3/1987 | Manganese | 126/369 X |
| 4,702,160 | 10/1987 | Manganese | 99/417 |
| 4,982,722 | 1/1991 | Wyatt | 126/400 |
| 5,370,042 | 12/1994 | Tolchin et al. | 99/417 |
| 5,579,946 | 12/1996 | Rowan et al. | 220/592.27 |

*Primary Examiner*—Timothy F. Simone

[57] ABSTRACT

A system for maintaining foods warm including an exterior container with a lower generally horizontal flat support surface and upstanding side wall with an open top, the open top having a receipt area including a generally annular flat surface. Also included is an interior container that is adapted to receive food and which has a lower generally horizontal flat surface and an upstanding side wall receivable within the exterior container. The interior container has an outwardly extending flange with its upper extent receivable in the receipt area. A thermal retention region is provided between the interior and exterior containers and includes a generally flat horizontal circular region between the lower surfaces of the interior and exterior containers and extends upwardly between the side walls of the interior and exterior containers. The thermal retention region has an essentially common thickness throughout its entire extent. The thermal region has indicia to indicate the extent to which a thermal medium such as hot water is placed within the exterior container to ensure that when the interior container is placed therein it will rise to an appropriate level.

7 Claims, 5 Drawing Sheets

FIG 4
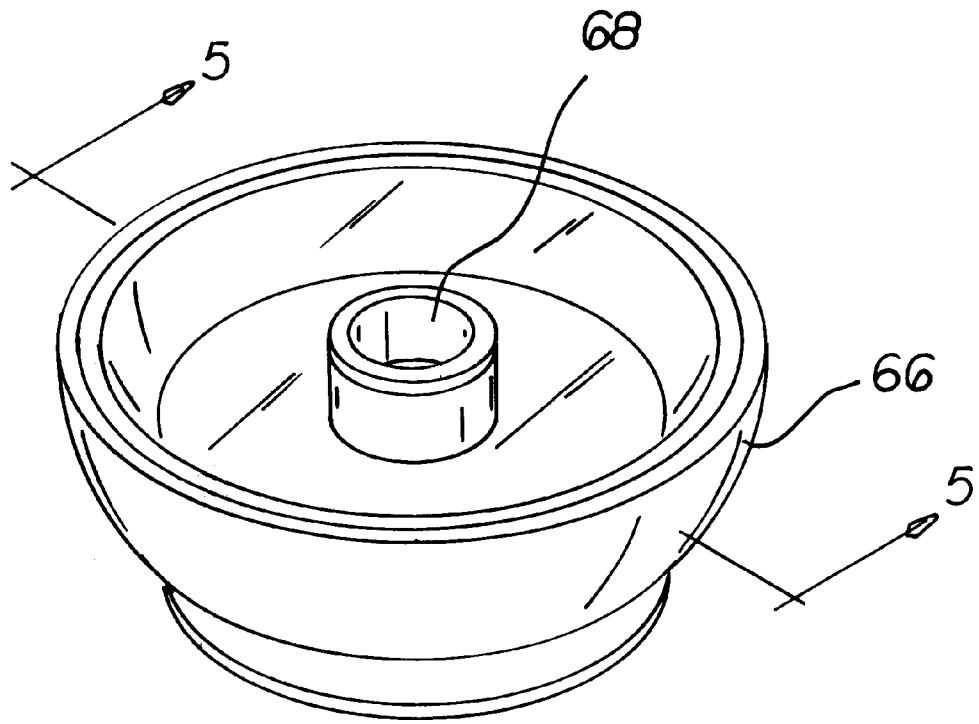
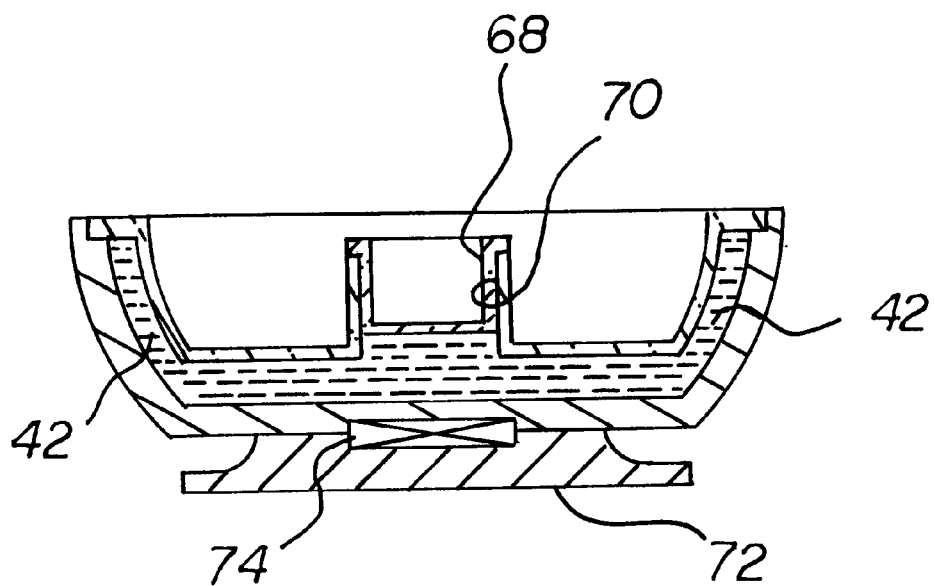
FIG 5

STEAMWARE SYSTEM

BACKGROUND OF THE INVENTION

1. Field of the Invention

The present invention relates to a steamware system and more particularly pertains to maintaining foods warm when removed from a cooking area and placed on an unheated surface such as a table.

2. Description of the Prior Art

The use of culinary equipment of various designs and configurations is known in the prior art. More specifically, culinary equipment of various designs and configurations heretofore devised and utilized for the purpose of preparing and maintaining foods at appropriate temperatures through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,579,946 to Rowan discloses Thermal Insulating Containers for Retaining Food and Beverage. U.S. Pat. No. 2,771,754 to Winkler discloses Dishes or Plats. U.S. Pat. No. 5,370,042 to Tolchin discloses a Container for Cooking Foods. U.S. Pat. No. 2,683,974 to Brown discloses a Child's Easy-Feeding Dish. U.S. Pat. No. 2,545,733 to Hatfield discloses a Child's Hot Food Dish. U.S. Pat. No. 4,982,722 to Wyatt discloses a Heat Retentive Server With Phase Change Core. U.S. Pat. No. 3,808,963 to Ludena discloses a Steam Cooker. U.S. Pat. No. 4,649,811 to Manganese discloses a Steam Cooking Device. U.S. Pat. No. 4,702,160 to Manganese discloses a Steam Cooking Device. Lastly, U.S. Pat. No. 120,995 to O'Sullivan discloses an Improvement in Dinner-Plate Covers.

While these devices fulfill their respective, particular objectives and requirements, the aforementioned patents do not describe steamware systems that allow maintaining food at warm temperatures when placed on unheated surfaces.

In this respect, the steamware system according to the present invention substantially departs from the conventional concepts and designs of the prior art, and in doing so provides an apparatus primarily developed for the purpose of maintaining foods warm when removed from a cooking area and placed on an unheated surface such as a table.

Therefore, it can be appreciated that there exists a continuing need for a new and improved steamware system which can be used for maintaining foods warm when removed from a cooking area and placed on an unheated surface such as a table. In this regard, the present invention substantially fulfills this need.

SUMMARY OF THE INVENTION

In view of the foregoing disadvantages inherent in the known types of culinary equipment of various designs and configurations now present in the prior art, the present invention provides an improved steamware system. As such, the general purpose of the present invention, which will be described subsequently in greater detail, is to provide a new and improved steamware system which has all the advantages of the prior art and none of the disadvantages.

To attain this, the present invention essentially comprises a new and improved system for maintaining foods warm when removed from a cooking area and placed on an unheated surface such as a table. The system includes an exterior container which has a lower generally horizontal flat support surface and an upstanding side wall in a generally cylindrical configuration with an open top. The open top has an upper receipt area, an intermediate receipt area and a lower receipt area. Each receipt area includes a generally annular flat surface of decreasing diameters from top to bottom. The exterior surface of the exterior container has outwardly extending handles. Also provided is an interior container adapted to receive food. The interior container has a lower generally horizontal flat surface and a generally cylindrical side wall receivable within the exterior container. The interior container has an outwardly extending flange at its upper extent receivable in the lower receipt area and the interior container has a handle that is pivotable between an elevated position for allowing removal of the interior container from the exterior container and a lower position receivable upon the intermediate receipt area. Additionally provided is a thermal retention region located between the interior and exterior containers. The thermal retention region includes a generally flat horizontal circular region between the lower surfaces of the interior and exterior containers and extends upwardly between the side walls of the interior and exterior containers. The thermal retention region has an essentially common thickness throughout its entire extent and terminates at its upper edge at a downwardly facing shoulder formed in the exterior container. The thermal region has indica to indicate the extent to which a thermal medium such as hot water is placed within the exterior container to ensure that when the interior container is placed therein it will rise to an appropriate level in proximity to the shoulder. Further provided is a lid in a dome-shaped configuration with a handle on its upper surface for positioning on and removing from the exterior container. The lid has an outwardly extending flange at its upper extent that is receivable within the upper receipt area of the exterior container. A semi-cylindrical supplemental interior container is positionable within a portion of the interior container with a flange at its upper extent for being received and supported by the intermediate receipt area. Lastly provided are a pair of ladles with food receiving areas at their lower ends and with inverted U-shaped upper ends which are adapted to be supported by the upper edge of the exterior container.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved steamware system which has all of the advantages of the prior art culinary equipment of various designs and configurations and none of the disadvantages.

It is another object of the present invention to provide a new and improved steamware system which may be easily and efficiently manufactured and marketed.

It is further object of the present invention to provide a new and improved steamware system which is of durable and reliable constructions.

An even further object of the present invention is to provide a new and improved steamware system which is susceptible of a low cost of manufacture with regard to both materials and labor, and which accordingly is then susceptible of low prices of sale to the consuming public, thereby making such Steamware system economically available to the buying public.

Even still another object of the present invention is to provide a steamware system for maintaining foods warm when removed from a cooking area and placed on an unheated surface such as a table.

Lastly, it is an object of the present invention to provide a new and improved system for maintaining foods warm including an exterior container with a lower generally horizontal flat support surface and upstanding side wall with an open top the open top having a receipt area including a generally annular flat surface. Also included is an interior container that is adapted to receive food and which has a lower generally horizontal flat surface and an upstanding side wall receivable within the exterior container. The interior container has an outwardly extending flange at its upper extent receivable in the receipt area. A thermal retention region is provided between the interior and exterior containers and includes a generally flat horizontal circular region between the lower surfaces of the interior and exterior containers and extends upwardly between the side walls of the interior and exterior containers. The thermal retention region has an essentially common thickness throughout its entire extent. The thermal region has indicia to indicate the extent to which a thermal medium such as hot water is placed within the exterior container to ensure that when the interior container is placed therein it will rise to an appropriate level.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a perspective view of a first alternate embodiment of the invention.

FIG. 5 is a cross-sectional view taken along line 5—5 of FIG. 4.

The same reference numerals refer to the same parts through the various Figures.

DESCRIPTION OF THE PREFERRED EMBODIMENT

Figure 1:
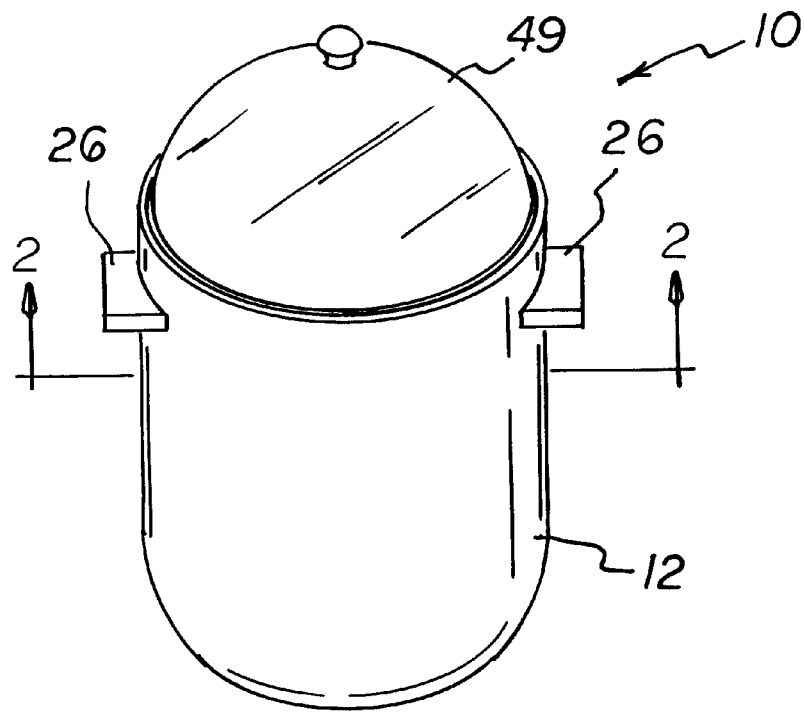
FIG. 1 is a perspective view of the preferred embodiment of the steamware system constructed in accordance with the principles of the present invention.
Figure 2:
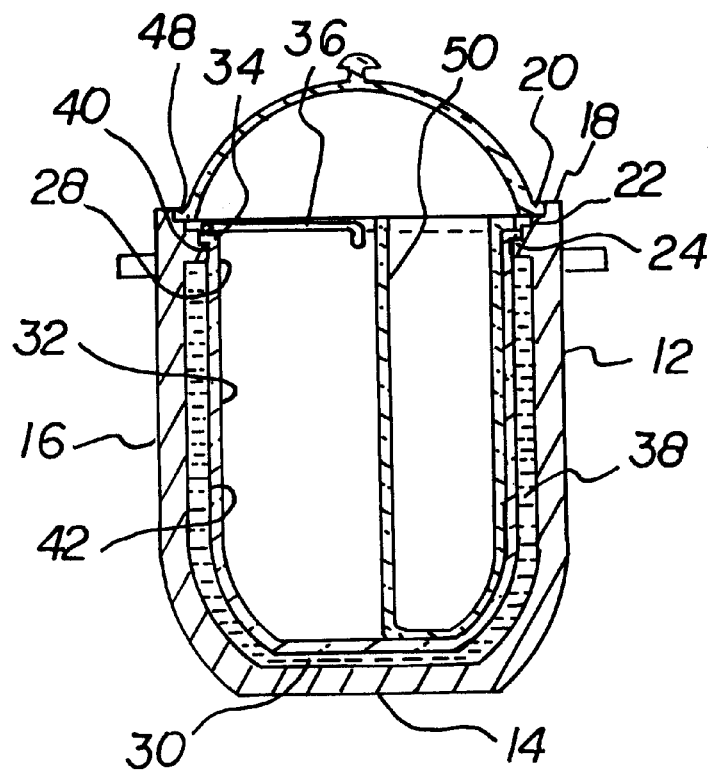
FIG. 2 is a cross-sectional view taken along line 2—2 FIG. 1.
Figure 3:
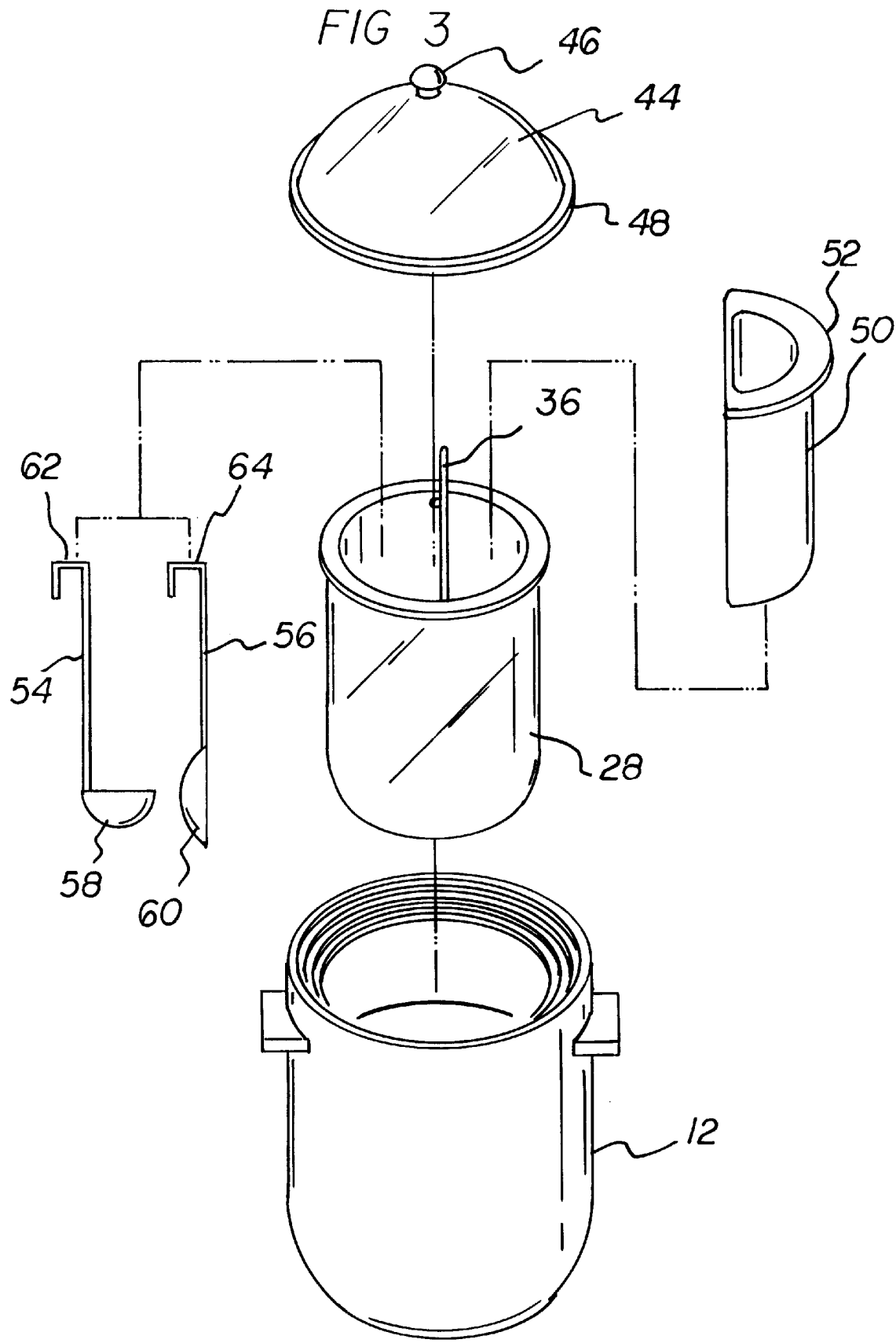
FIG. 3 is an exploded perspective view of the system shown in FIGS. 1 and 2.
Figure 6:
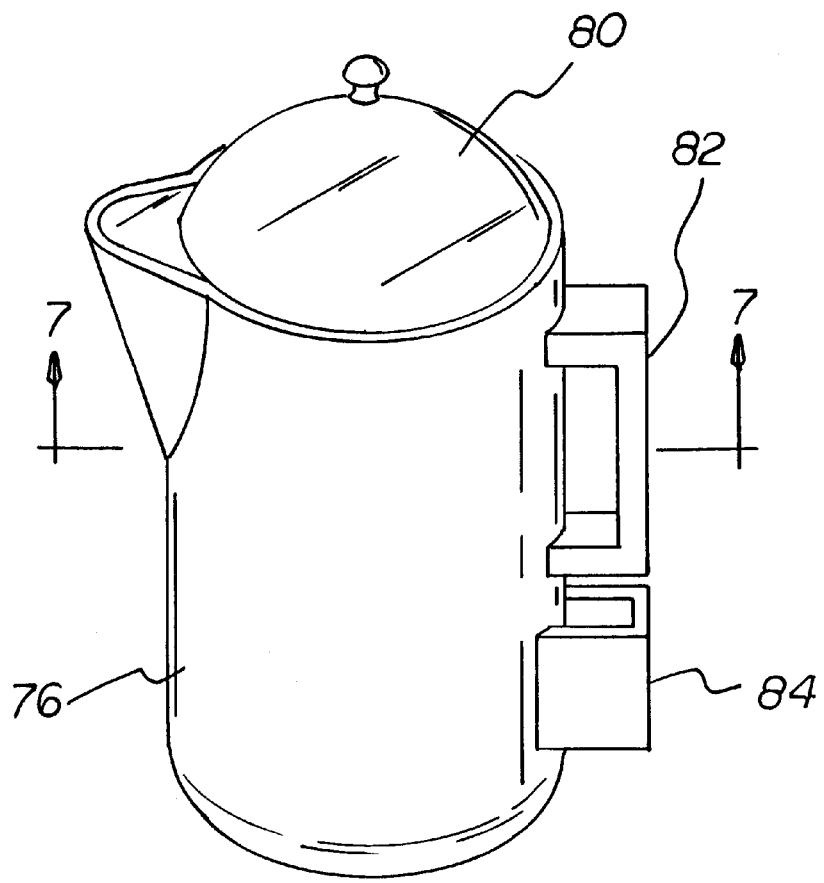
FIG. 6 is a perspective view of a second alternate embodiment of the invention.
Figure 7:
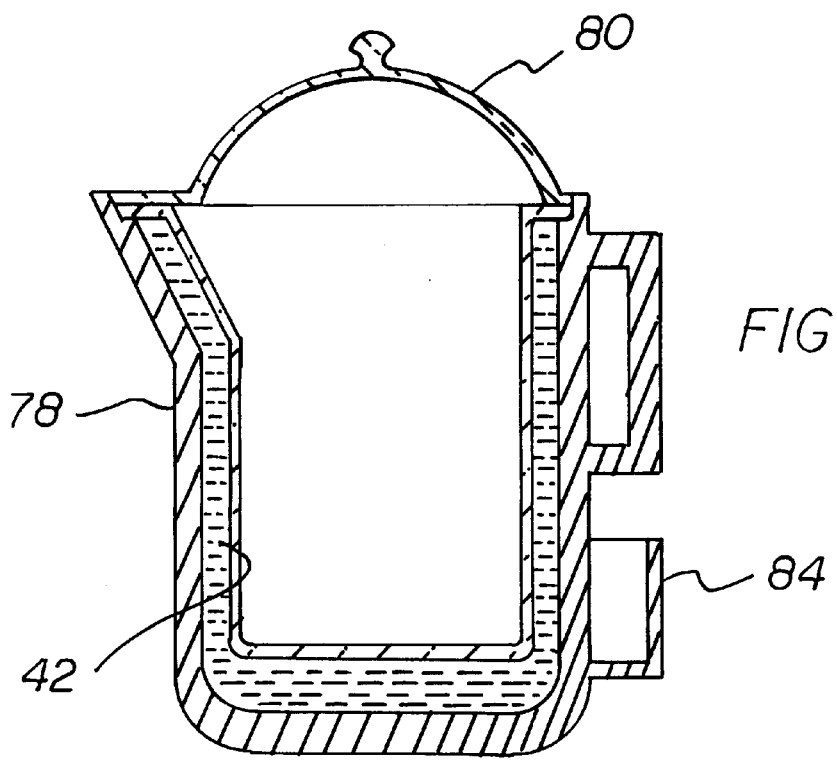
FIG. 7 is a cross-sectional view taken along line 7—7 of FIG. 6.
Figure 8:
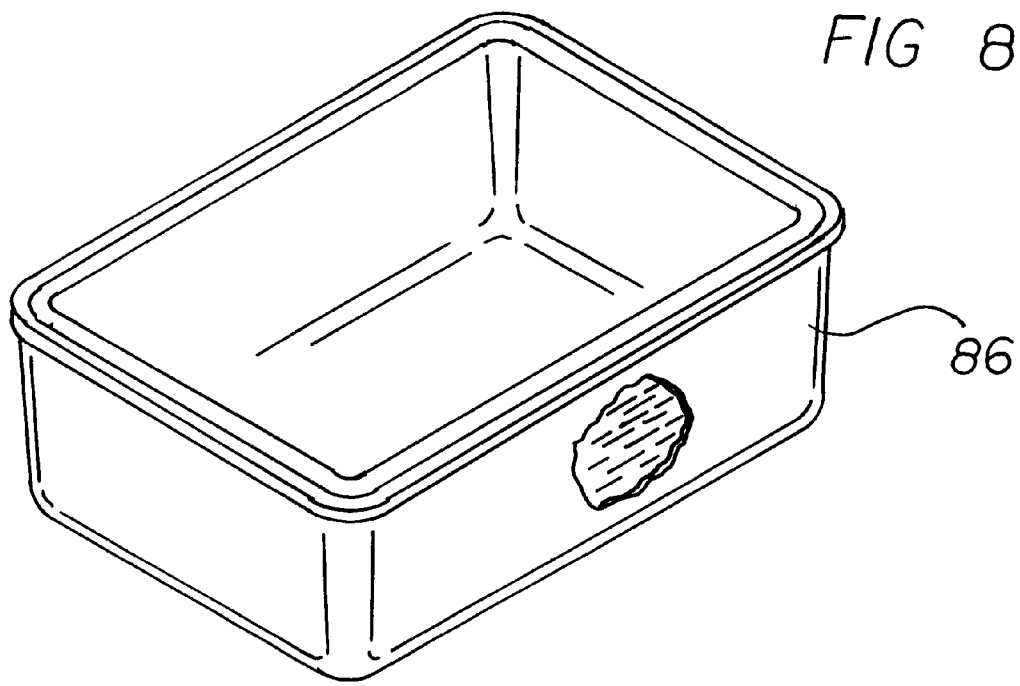
FIGS. 8 and 9 are perspective illustrations of yet further alternate embodiments of the present invention.
Figure 9:
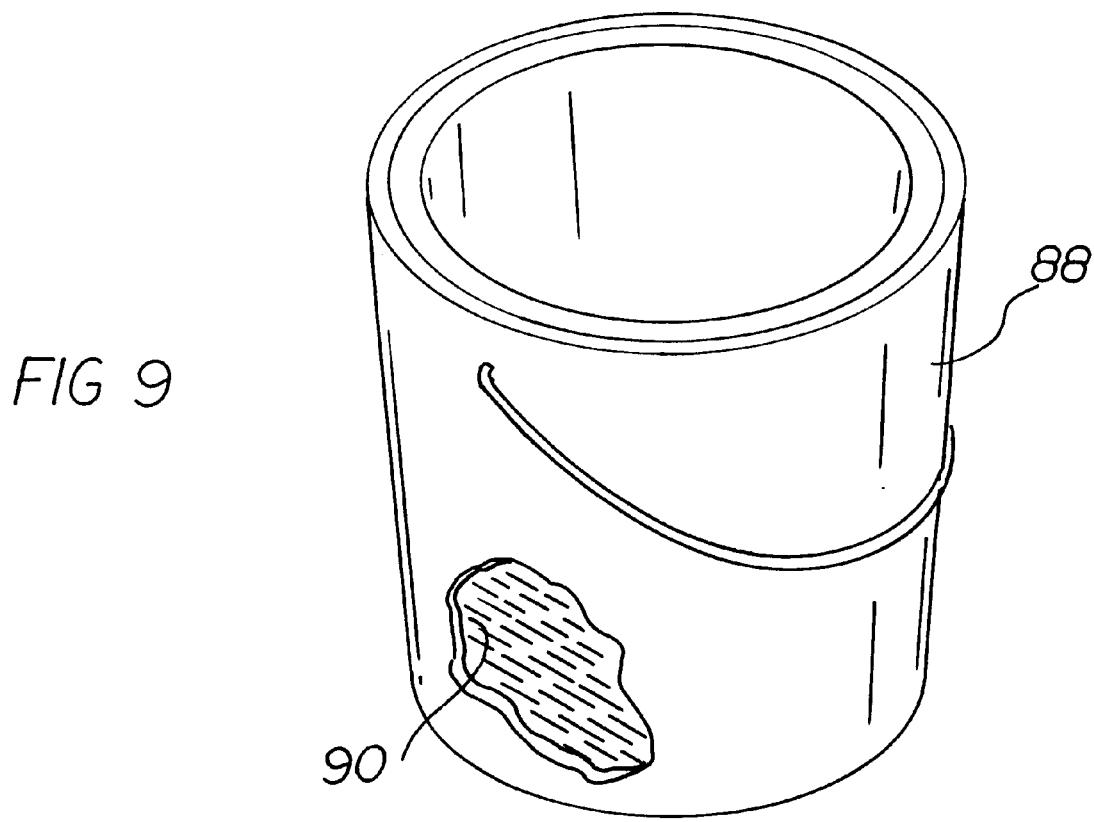

With reference now to the drawings, and in particular to FIG. 1 thereof, the preferred embodiment of the new and improved steamware system embodying the principles and concepts of the present invention and generally designated by the reference numeral 10 will be described.

The present invention, the steamware system 10, is comprised of a plurality of components. Such components in their broadest context include an exterior container, an interior container and a thermal retention region. Such components are individually configured and correlated with respect to each other so as to attain the desired objective.

More specifically, the new and improved system 10 for maintaining foods warm when removed from a cooking area and placed on an unheated surface such as a table comprises, as a primary component, an exterior container 12. Such container has a lower generally horizontal flat support surface 14 and an upstanding side wall 16 in a generally cylindrical configuration. The side walls terminate with an open top 18. The open top has an upper receipt area 20, an intermediate receipt area 22 and a lower receipt area 24. Each receipt area includes a generally annular flat surface of decreasing diameters from top to bottom for purposes as will be described. The exterior surface of the exterior container has outwardly extending handles 26.

Also provided is an interior container 28 adapted to receive food. The interior container has a lower generally horizontal flat surface 30 and a generally cylindrical side wall 32 receivable within the exterior container. The interior container has an outwardly extending flange 34 at its upper extent receivable in the lower receipt area. The interior container also has a handle 36 that is pivotable between an elevated position for allowing removal of the interior container from the exterior container. The handle is also pivotable to a lower position received upon the intermediate receipt area.

Additionally provided is a thermal retention region 38. Such region is located between the interior and exterior containers. The thermal retention region includes a generally flat horizontal circular region between the lower surfaces of the interior and exterior containers. The thermal retention region then extends upwardly between the side walls of the interior and exterior containers. The thermal retention region preferably has an essentially common thickness throughout its entire extent. It terminates at its upper edge with a downwardly facing shoulder 40 formed in the exterior container. The thermal region also has indicia 42 in the form of a ridge or other marking to indicate the extent to which a thermal medium such as hot water is placed within the exterior container. This is to ensure that when the interior container is placed therein it will rise to an appropriate level in proximity to the shoulder and not spill out. Filling the thermal retention region insufficiently will decrease the warming effect of the hot water and/or steam upon the food within the interior container.

Further provided is a lid 44 in a dome-shaped configuration. The lid has a handle 46 on its upper surface for positioning on and removing from the exterior container. The lid also has an outwardly extending flange 48 that is receivable within the upper receipt area of the exterior container.

A semi-cylindrical supplemental interior container 50, an optional component, is positionable within the interior container. It is formed with a flange 52 at its upper end for being received and supported by the intermediate receipt area of the exterior container.

Lastly provided with the primary embodiment as optional components are a pair of ladles 54, 56. Such ladles are formed with food receiving areas 58, 60 at their lower ends. Inverted U-shaped ends 62, 64 are formed at the upper ends of the ladles. Such upper ends are adapted to be supported by the upper edge of the exterior container.

In an alternate embodiment of the system, the container 66 is torus shaped. It has a separable container 68 located positionable on the center opening 70 of the interior container. A bracket base is formed beneath the exterior container 72. A rotatable bearing 74 is positioned between the base and the bottom of the exterior container.

In yet another alternate embodiment of the system, the interior container 76 is a coffee pot. The exterior container 78 has a lid 80, a handle 82 and a generally rectilinear container 84 for receiving tea bags and the like.

In an additional embodiment of the system, the interior container is a wash basin 86.

In an additional embodiment of the system, the interior container is a bucket 88. An indicia 90 is formed in the interior surface of each exterior container as in the primary embodiment.

As described hereinabove, the system of the present invention is a system to keep food warm when placed on a non-heated such as a table in order to allow the food preparer to continue with the preparation of other foods or to perform some other task.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved system for maintaining foods warm when removed from a cooking area and placed on an unheated surface such as a table comprising, in combination:

an exterior container having a lower generally horizontal flat support surface and an upstanding side wall in a generally cylindrical configuration with an open top, the open top having an upper receipt area, an intermediate receipt area and a lower receipt area, each receipt area including a generally annular flat surface of decreasing diameters from top to bottom, the exterior surface of the exterior container having outwardly extending handles;

an interior container adapted to receive food with a lower generally horizontal flat surface and generally cylindrical side wall receivable within the exterior container, the interior container having an outwardly extending flange at its upper receipt receivable in the lower receipt area, the interior container having a handle pivotable between an elevated position for allowing removal of the interior container from the exterior container and a lower position receivable upon the intermediate receipt area;

a thermal retention region located between the interior and exterior containers including a generally flat horizontal circular region between the lower surfaces of the interior and exterior containers and extending upwardly between the side walls of the interior and exterior containers, the thermal retention region having an essentially common thickness throughout its entire extent and terminating at its upper edge at a downwardly facing shoulder formed in the exterior container, the thermal region having indicia to indicate the extent to which a thermal medium such as hot water is placed within the exterior container to ensure that when the interior container is placed therein it will rise to an appropriate level in proximity to the shoulder;

a lid in a dome-shaped configuration with a handle on its upper surface for positioning on and removing from the exterior container, the lid having an outwardly extending flange at its upper extent receivable within the upper receipt area of the exterior container;

a semi-cylindrical supplemental interior container positionable within a portion of the interior container with a flange at its upper extent for being received and supported by the intermediate receipt area; and a pair of ladles having food receiving areas at their lower ends and having inverted U-shaped upper ends adapted to be supported by the upper edge of the exterior container.

2. A system for maintaining foods warm comprising:

an exterior container having a lower generally horizontal flat support surface and upstanding side wall with an open top the open top having a receipt area including a generally annular flat surface;

an interior container adapted to receive food with a lower generally horizontal flat surface and an upstanding side wall receivable within the exterior container, the interior container having an outwardly extending flange at its upper extent receivable in the receipt area;

a thermal retention region between the interior and exterior containers including a generally flat horizontal circular region between the lower surfaces of the interior and exterior containers and extending upwardly between the side walls of the interior and exterior containers, the thermal retention region having an essentially common thickness throughout its entire extent, the thermal region having indicia to indicate the extent to which a thermal medium such as hot water is placed within the exterior container to ensure that when the interior container is placed therein it will rise to an appropriate level.

3. The system as set forth in claim 2 wherein the side walls of the interior and exterior containers are essentially cylindrical and further including a lid positionable above the interior container.

4. The system as set forth in claim 2 wherein the interior container is torus shaped with a separable container positionable on the center of the interior container and with a base therebeneath and a rotatable bearing between the base and the bottom of the exterior container.

5. The system as set forth in claim 2 wherein the interior container is a coffee pot and the exterior container has a lid and a handle and a generally rectilinear container for receiving tea bags.

6. The system as set forth in claim 2 wherein the interior container is a wash basin.

7. The system as set forth in claim 2 wherein the interior container is a bucket.

* * * * *